June 19, 1962    H. FLIEGNER ETAL    3,039,592
EQUIPMENT TO SUPPLY FLAT ARTICLES TO A CONVEYING SYSTEM
Filed Jan. 29, 1959
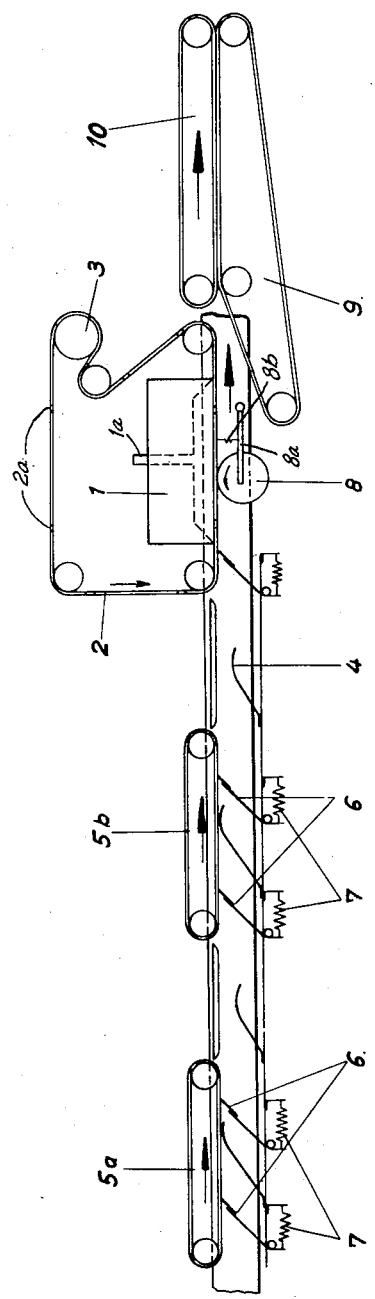
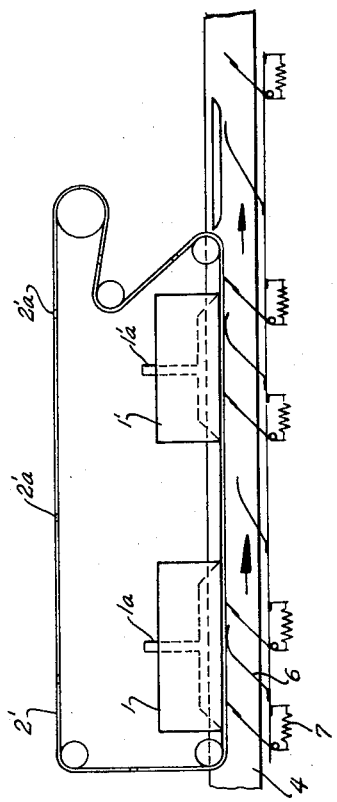
INVENTORS
H. FLIEGNER - W. KASTENBEIN
BY

United States Patent Office 3,039,592
Patented June 19, 1962

3,039,592
EQUIPMENT TO SUPPLY FLAT ARTICLES TO A CONVEYING SYSTEM
Horst Fliegner, Berlin-Lankwitz, and Werner Kastenbein, Berlin-Neukolln, Germany, assignors to International Standard Electric Corporation, New York, N.Y., a corporation of Delaware
Filed Jan. 29, 1959, Ser. No. 789,859
Claims priority, application Germany Feb. 17, 1958
1 Claim. (Cl. 198—34)

The invention deals with an article spacing equipment by which flat articles of paper, cardboard, sheet metal, etc., are fed into a conveying system in a predetermined spaced relation entering this regardless of the random distances at which the articles may have been delivered to that equipment. This equipment employs a perforated band that circulates past the air inlet of a suction channel whilst being in close proximity with this inlet, whereby the articles will each be sucked against this band and conveyed by it a certain distance. This equipment is situated ahead of the conveying channel in order to feed into it the articles to be conveyed. The mutual distances of the holes constituting the perforations of that band are such that the articles leaving said equipment and entering the conveying system shall follow upon each other at predetermined minimum distances.

Equipment of this type is known in connection with transportation systems and with apparatus used in the graphic industry. The prior equipment involves the supposition that the articles to be handled are taken from a pile of such articles which are all of the same nature. However, the equipment provided by the invention deals with articles of various sizes and shapes which are supplied to it quite randomly, being in particular employed for mechanizing the postal service, that is, for the conveyance of letters, post cards, and other such mail articles furnished to the equipment irrespective of their different sizes and different properties and at predetermined mutual distances. The prior equipment are not suitable in this respect, especially because they do not consider the dimensions, in particular the different lengths of the articles.

According to the invention, a body, rotatable in opposition to the motion of the perforated band, is arranged in the conveying channel to bear against this band. Such body may be a roller or a conveying belt, and the friction between it and any one of the articles to be conveyed is greater than that between any two articles which may adhere to each other and the invention permits separating such adhering articles with safety.

Ahead of the conveying channel containing the perforated or suction band, strip-off devices are arranged to separate articles sticking together. These strip-off devices comprise scrapers mounted either fixedly or movably and pressed against an edgewise moving conveying belt, the free ends of the scrapers having a great capability of friction. Also, such scrapers may be used in connection with bands arranged to circulate past a suction channel.

The invention thus provides that the articles to be supplied to the conveyor shall be at approximately equal distances apart, and that any two articles sticking together shall not be able to enter the conveying channel.

The above-mentioned and other features and objects of the invention and the manner of attaining them will become more apparent and the invention itself will be best understood by reference to the following description of an embodiment of the invention taken in conjunction with the accompanying drawings in which:

FIG. 1 is a plan view of a system utilizing the invention; and

FIG. 2 is a plan view of a modification of a portion of the system shown in FIG. 1.

Referring to FIG. 1, there is shown a suction device 1 over one side of which a perforated endless band 2 is moved by a drive pulley 3 past the air-inlet 1a of the suction device 1. A supply conveyor belt 4 runs horizontally and carries articles thereon in an upright position. Belt 2 has a series of spaced perforations 2a therein, the spacing between adjacent perforations controlling the spacing between articles to be delivered to the conveyor system to be later described. Ahead of the device 1 an edgewise acting conveying belt 5a is arranged to constitute a wall of the conveying channel. A second edgewise conveying belt 5b similar to 5a may be disposed between this and band 2. One or more scrapers 6 are pressed by springs 7 against the belts 5a, 5b. The roller 8, provided according to the invention, is mounted in front of the suction channel 1a of device 1 and on a rocker arm 8a drawn by a spring 8b toward the suction band 2. Roller 8 and band 2 are driven in opposition to each other. Thereby any article sticking to another sucked against device 1 will, even in obstinate cases, be held back by roller 8 until the article contacting with band 2 has left the equipment 1—8 and has been spaced from roller 8 thereof the distance predetermined by this equipment. Thus, any article sticking to another and not detached therefrom by any one of the scrapers 6 cooperating with the belts 5a, 5b will be detached by roller 8. The article freed from any one sticking to it passes on to the opposed conveying belts 9, 10 running in the same direction in order to be clamped between them.

The belts 9, 10 and band 2 are moved at speeds higher than those of the belts 4, 5a, 5b.

FIG. 2 is a plan view of an alternate arrangement of the showing in FIG. 1. Instead of providing separate edgewise belts as in FIG. 1 (5a, 5b), there is utilized a single perforated belt 2' which has a series of equally spaced perforations 2'a therethrough, as shown. The belt 2' is carried past two suction devices 1 and 1', having air inlets 1a, 1'a, respectively. The belt 2' and the suction devices 1, 1' operate in the same way as the elements 1 and 2 in FIG. 1. The conveying belts 9, 10, have not been shown in FIG. 2, but it will be appreciated that the belt 4 feeds into a pair of belts similar to belts 9, 10.

While I have described above the principles of my invention in connection with specific apparatus, it is to be clearly understood that this description is made only by way of example and not as a limitation to the scope of my invention, as set forth in the objects thereof and in the accompanying claim.

What is claimed is:

Apparatus for separating and spacing random-sized flat articles comprising suction means, article separating means positioned adjacent said suction means and in abutting relationship therewith, said separating means comprising a movable belt and a plurality of retarding means, said movable belt having spaced perforations therein and having a run between the suction means and said plurality of retarding means so that the movement of the belt past the suction means provides suction through the belt perforations, means for feeding random-sized articles to the junction of the belt and the retarding means, means for moving the belt to urge the articles in one direction and means for controlling the retarding means to urge the articles in the opposite direction, and tensioning means urging the retarding means towards the belt so that the adhesion between the unperforated portions of the belt and any article is less than the adhesion between the said retarding means and said article, and that the adhesion between the perforated portions of the belt and said article is greater than the adhesion between the retarding means and said article, whereby articles are individually passed in spaced relationship between the belt and said plurality of retarding means, at least one of said plurality of retarding means consisting of pivot means, a scraper mounted for rotation about said pivot means, and a spring coupled to said scraper to urge said scraper towards said belt, at least one of said plurality of retarding means comprising a rotatable roller driven in opposition to the movement of said belt.

References Cited in the file of this patent

UNITED STATES PATENTS

| | | |
|---|---|---|
| 1,672,412 | Hitchcock | June 5, 1928 |
| 2,023,531 | Kleinschmit | Dec. 10, 1935 |
| 2,441,912 | Streich | May 18, 1948 |
| 2,905,309 | Makrides | Sept. 22, 1959 |
| 2,941,653 | Kriemelmeyer | June 21, 1960 |